UNITED STATES PATENT OFFICE.

GEORGE W. LARAWAY, OF NEW YORK, N. Y., ASSIGNOR TO THE NATIONAL PACKAGE COMPANY, OF GLENS FALLS, NEW YORK.

FIBROUS COMPOSITION OF MATTER AND METHOD OF MAKING SAME.

SPECIFICATION forming part of Letters Patent No. 664,957, dated January 1, 1901.

Application filed March 25, 1899. Serial No. 710,452. (No specimens.)

*To all whom it may concern:*

Be it known that I, GEORGE W. LARAWAY, a citizen of the United States, residing at New York, in the county and State of New York, have invented new and useful Improvements in Fibrous Compositions of Matter and Methods of Making the Same, of which the following is a specification.

This invention relates to that class of hard and tough fibrous compositions of matter which are composed mainly of a finely-comminuted fibrous substance and a fusible cementing agent—for instance, rosin or other resinous matter — which ingredients are united by intimately mixing them and subjecting the mixture to heat and pressure.

The object of this invention is to produce a composition of matter of this general character which is capable of resisting hot or cold water or oil and which is therefore suitable for the manufacture of vessels and other articles which are designed for containing such liquids or which are liable in their use to be exposed to the action of such liquids.

In practicing my invention I slake quicklime, preferably in hot water, and add while the lime is slaking paraffin-wax, preferably in about the proportion of three ounces of paraffin-wax to every pound of quicklime. The lime and paraffin combine during this operation, and the resulting material is removed, drained, and allowed to dry or, if preferred, is dried by artificial heat, forming a light porous substance which is lighter than water and which strongly repels water. The combined lime and paraffin is then reduced to a fine powder and intimately mixed with a fusible cementing substance, also reduced to a fine powder. This can be conveniently done by placing both materials in an ordinary tumbling-barrel and pulverizing the materials in the same until the desired degree of fineness is obtained. I prefer as the cementing agent the resinous matter which is ordinarily known in the trade as "E" rosin; but any other resinous matter, gum, or other suitable fusible cementing substance may be employed. I prefer to use equal parts of rosin and combined lime and paraffin; but these proportions may vary somewhat in accordance with the materials employed and the nature of the article to be produced. This mixture of powdered rosin and combined lime and paraffin is then intimately mixed with a finely-reduced fibrous material. The particular fibrous material which is employed may vary in different cases and localities in accordance with the available supply of such material, its cost, and the character of the articles which are to be manufactured from the composition. For illustration, waste paper can be advantageously used by reducing or comminuting the same in a suitable cutting or pulverizing machine to a fine fluffy or flocky condition. Cornstalks, bagasse, palmetto-root, and many other vegetable fibrous substances or materials can also be employed by simply reducing the same to a fine condition and without undergoing any other treatment. When a fireproof substance is desired, fibrous minerals, such as asbestos or mica, can be employed, and for some purposes a mixture of vegetable and mineral materials can be advantageously used. This finely-reduced fibrous matter is then intimately mixed with the above-described powder, composed of resinous matter and combined lime and paraffin, preferably in the proportion of equal parts or thereabout of fiber and the mixture of cementing agent, lime, and paraffin. These ingredients can also be conveniently mixed in an ordinary tumbling-barrel. The resulting dry fluffy mixture is then compressed, preferably by a hydraulic press, under the application of a sufficient degree of heat to fuse or melt the cementing agent, whereby a hard and tough material is produced which is suitable for the manufacture of a great variety of articles and which is not disintegrated by hot or cold water or by oil. For instance, by using vegetable fiber, such as waste paper, wood-pulp, cornstalks, bagasse, &c., as the fibrous ingredient a material is produced which is very useful for kegs, barrels, pails, and other vessels and articles of manufacture which are required to be proof against hot and cold water and oil.

Pigments can be mixed with the ingredients for giving the composition throughout the desired color, or such pigments can be dusted on the dies in which the material is pressed for facing the composition with the desired color. The dry fluffy mixture can be pressed directly and in one operation into the desired form of the article which is desired to be produced.

Instead of paraffin-wax any other suitable waterproofing ingredient may be combined with the lime—for instance, tallow or some other suitable animal fat or oil or linseed-oil may be employed.

I claim as my invention—

1. The herein-described method of producing a hard and tough product which consists in slaking lime, adding a waterproofing ingredient, pulverizing the combined substance, mixing it with a fusible cementing ingredient and fibrous matter and pressing the mixture under the application of heat, substantially as set forth.

2. The herein-described hard and tough product consisting of fibrous matter, a fused cementing ingredient, lime and a waterproofing ingredient, substantially as set forth.

Witness my hand this 22d day of March, 1899.

GEORGE W. LARAWAY.

Witnesses:
WM. E. SPIER,
HERBERT L. SELLECK.